W. & D. M. HUNTER.
Cultivator.
No. 94,751.  Patented Sept. 14, 1869.
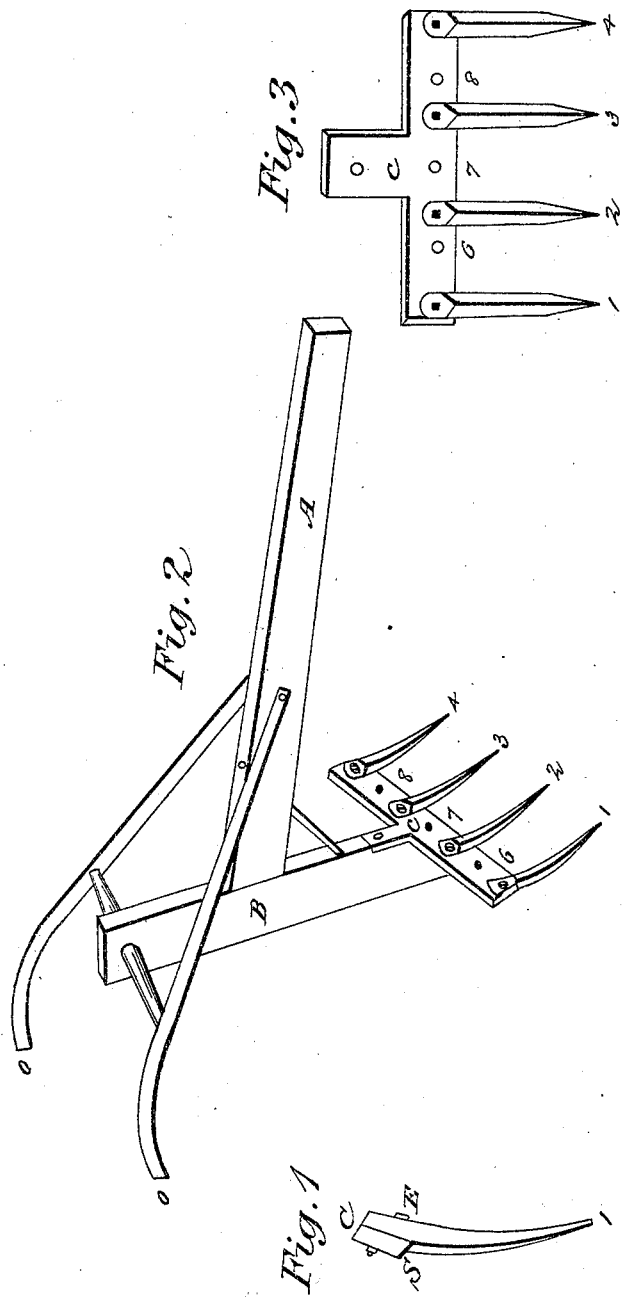

UNITED STATES PATENT OFFICE.

WILLIAM HUNTER AND DANIEL M. HUNTER, OF MEADVILLE, PA.

IMPROVEMENT IN SOIL-TILLERS.

Specification forming part of Letters Patent No. 94,751, dated September 14, 1869.

*To all whom it may concern:*

Be it known that we, WILLIAM HUNTER and DANIEL M. HUNTER, of the city of Meadville, in the county of Crawford, State of Pennsylvania, have invented a new and Improved Soil-Tiller; and we do hereby declare that the following is a full and exact description of the same, reference being had to the accompanying drawings and the letters of reference marked thereon.

The objects of our invention are as follows, to wit: It operates as a cultivator among corn, potatoes, cabbage, strawberries, and other plants raised in rows or hills. It is easily adjusted to wider or narrower rows. It will work shallow or deep at the will of the operator. It may be so adjusted as to act as a double-mold-board plow or shovel-plow. It may be used as a subsoiler, and there is scarcely any operation of tillage than can be performed with horse-power but can be well done with this implement when it is properly adjusted.

Figure 2 represents our tiller adjusted as a cultivator.

A is a plow-beam, o o the handles, and B the post or standard, to which our tiller is attached in any good and substantial manner.

C is the head-plate, and may be constructed about twenty inches long by three and a half wide and one-half inch thick, and may be made of cast or wrought iron. This head-piece is constructed something like a letter T in shape, for the purpose of bolting the same to the wood-work. This head-plate is perforated for five tines or teeth, equidistant, and also for four. For five tines, 1 6 7 8 4, see Fig. 3. For four tines, 1 2 3 4, see Fig. 4.

These tines or teeth may be of any desired length or shape, and they are bolted to the head-piece by a bolt, E, Fig. 1. The lower side of the head-piece is brought down to an angle with its face, (see Fig. 1,) which shows the end of the head-piece C, with the beveled edge at s. The tine or tooth has a shoulder made to fit the beveled edge of the head-piece C. This is also shown at s, Fig. 1. This shoulder gives strength to the tines or teeth when constructed as described.

When it is desired to use the tiller as a shovel-plow, the end tines are removed and one of them placed in the hole 7.

It will be at once seen that any desired number of tines can be used to suit the nature of the soil or the kind of work desired to be done—either as a cultivator, a shovel-plow, or as a subsoiler; and the shape and length of the tines may also be varied.

What we claim as our invention, and desire to secure by Letters Patent, is as follows, to wit:

The construction of the head-piece C, with the beveled edge at s, in combination with the tines or teeth, constructed as described, for the purposes set forth.

WM. HUNTER.
D. M. HUNTER.

Witnesses:
A. B. RICHMOND,
ALEX. THOMPSON.